June 4, 1968  J. L. PARK ETAL  3,386,307
BALL RECIRCULATING MECHANISM FOR BALL SCREW AND NUT ACTUATORS
Filed March 15, 1967

INVENTOR.
JERALD L. PARK
CHARLES ROSSETTI

ATTORNEYS.

United States Patent Office 3,386,307
Patented June 4, 1968

3,386,307
BALL RECIRCULATING MECHANISM FOR BALL SCREW AND NUT ACTUATORS
Jerald L. Park, Stratford, and Charles Rossetti, Huntington, Conn., assignors to Avco Corporation, Stratford, Conn., a corporation of Delaware
Filed Mar. 15, 1967, Ser. No. 623,454
2 Claims. (Cl. 74—459)

ABSTRACT OF THE DISCLOSURE

The illustrated ball screw and nut mechanism includes a conventional screw and nut, each having a helical channel, which cooperate through antifriction balls placed between them. The balls are permitted to circulate from the end of the single convolution helix back to the beginning by connecting the ends of the helix in the nut with a groove across which the balls can travel, and by removing from the corresponding location on the screw the land between adjacent grooves. The relative rotation between the nut and screw is limited by the number of degrees of land removed from the screw. However, the balls do not change their radial position at any time, including those times when traveling from the end of the spiral back to the beginning.

THE PRIOR ART

One prior art ball screw and nut mechanism is represented by the U.S. patent to Hoffar No. 2,298,011, issued in 1942. This patent utilizes an antifriction screw and nut arrangement in which the screw has a spiral groove on its surface. The nut is provided with a complementary spiral groove and the balls which are inserted in the spiral grooves serve to transmit the axial forces from one to the other. As the nut and screw are relatively rotated, the balls in the grooves also rotate and move along the grooves. To provide a closed loop path from the end of the spiral grooves to the beginning, a passage 21 is provided. It will be noted that in the prior art patent to Hoffar the passage is through the nut portion of the device so that there is an outward radial displacement of the balls into the passage 21.

Another prior art device is represented in the U.S. patent to Mort et al., No. 2,486,055. In this case, a single convolution groove is provided. Each groove consists of a helical portion and a connecting cross-over portion. The so-called cross-over portion is through the screw member, and therefore the balls, when passing from the end of the single turn helix to the beginning, must be displaced radially inwardly.

THE PROBLEM SOLVED BY THIS INVENTION

In certain applications it is necessary that both the screw and the nut be rotated together at very high speed with little relative rotation between the two elements. Under these circumstances the balls are subjected to large centrifugal forces, and if moved out of their radial position either inwardly or outwardly, excessive forces may be required to return them to the helix. This invention overcomes the foregoing problem by maintaining the balls at their original radial position at all times, including those times when the balls are "crossing over" from the end of the helix to the beginning. This is done by making the connecting cross-over in a groove which is at the same radial distance as the spiral, and by removing that portion of the land on the other element which would otherwise interfere with the travel of the balls along the cross-over. Such an arrangement permits only limited rotation between the nut and screw, but in the equipment as reduced to practice, about 30 degrees of relative rotation was all that was required.

THE DRAWINGS

Figure 1:
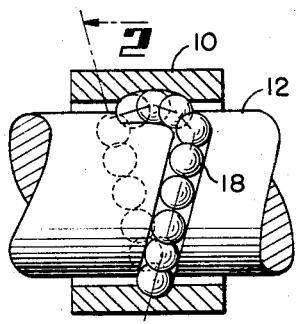
Figure 2:
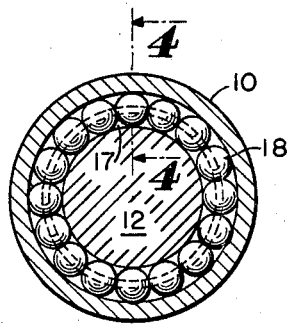
Figure 3:
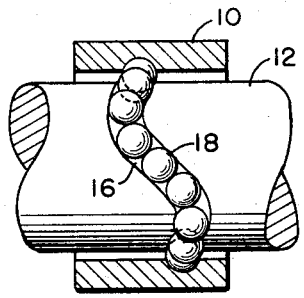
Figure 5:
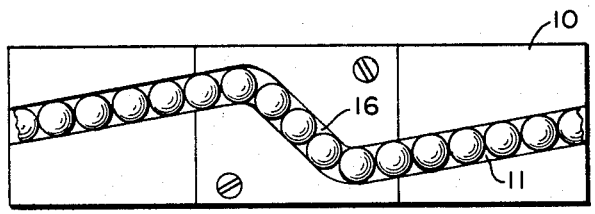
Figure 4:
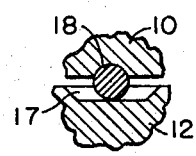
Figure 6:
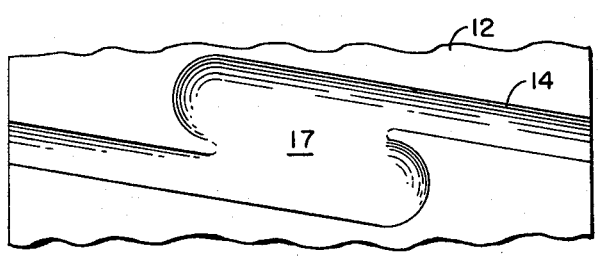

FIGURE 1 of the drawings is a side view partly in section of the illustrated embodiment of this invention;
FIGURE 2 is a section taken through the line 2—2 in FIGURE 1;
FIGURE 3 is a view similar to FIGURE 1 but rotated 90 degrees to more clearly show the cross-over;
FIGURE 4 is a section taken through the line 4—4 in FIGURE 2;
FIGURE 5 is a laid out generated view of the interior surface of the nut portion; and
FIGURE 6 is a laid out generated view of the exterior surface of the screw portion.

THE ILLUSTRATIVE EMBODIMENT

The ball screw and nut actuator comprises a nut portion 10 having a single convolution helical groove 11 and a screw portion 12 in which is provided a corresponding single convolution helical groove 14. The ends of the groove 11 are connected by a cross-over groove 16, while the land in the corresponding position 17 in the screw is removed. The land removal extends over any given number of degrees, in a practical case, about 30 degrees. The entire passage defined by the helical grooves 11 and 14 and the cross-over 16 is filled with balls 18.

THE OPERATION

In the particular application for which the illustrated embodiment is intended, it is assumed that both the nut and screw ordinarily run at the same high speed and thus subject the balls to high centrifugal forces. It is also assumed that very small relative movement between the screw and nut is intended or required. As slight relative rotation between the nut and screw occurs, the balls rotate and move along the helix. As each ball reaches the end of the helix, depending upon the direction of rotation, it enters the cross-over passage 16 and returns to the beginning of the helix. Its travel is unencumbered because the land between the grooves in the screw have been removed at 17, permitting freedom of motion of the balls. However, the relative rotation between the screw and the nut is limited by the amount of land which has been removed. As will be readily observed, the amount of relative rotation which is possible is something less than the amount of land removed.

APPLICATIONS

The illustrated embodiment of this invention is finding application as a torque-sensitive actuator for controlling the pressure applied to the rollers of a toroidal drive; that is to say, the screw 12 comprises a shaft connected to one disk of a toroidal drive while the nut 10 supplies the reaction force of the other disk, the roller being between the opposing disks and the pressure on the rollers being controlled by the relative position of the nut to the screw.

Many modifications of this invention are immediately apparent. For example, a plurality of single convolution helixes may be used to provide better support between the screw screw and nut, and in the embodiment of this invention as reduced to practice a plurality of helixes was used. Furthermore, the location of the cross-over may be in the screw rather than the nut with the removal of the land being from the nut rather than the screw. For the purpose of this specification, the word "screw" means any shaft or internally bored member having the appropriate grooves and balls.

It is intended, therefore, that this invention be limited

We claim:
1. In a ball screw and nut actuator, the combination comprising:
- a screw member having an external helical groove thereon;
- a nut member having an axial bore provided with a single internal helical groove convolution therein complementary to the single helical groove in said screw member, said complementary grooves in said nut and screw members providing a single convolution helical passage; and
- a cross-over passage from the end of one helical groove to the beginning, said cross-over passage being a groove in one of said members, said last-named groove being at the same radial distance from the axis of said actuator as the helical groove in said one member, said passage and said cross-over passage being entirely filled with a plurality of balls, the land between the beginning of the groove and the end of the groove in the other member being removed for a given number of degrees to permit limited relative rotation by said screw member and said nut member.

2. The invention as defined in claim 1 wherein said cross-over passage is located in said screw member and wherein said land is removed from between the grooves of said nut member.

References Cited

UNITED STATES PATENTS

| | | | |
|---|---|---|---|
| 1,890,144 | 12/1932 | Best | 74—459 |
| 2,450,282 | 9/1948 | Jackson | 74—459 |
| 3,156,133 | 11/1964 | Anthony | 74—459 |

FRED C. MATTERN, JR., *Primary Examiner.*

LEONARD H. GERIN, *Examiner.*